United States Patent [19]

Inoue

[11] Patent Number: 5,326,965
[45] Date of Patent: Jul. 5, 1994

[54] NON-CONTACT IC CARD AND METHOD OF INITIALIZING SAME

[75] Inventor: Takeshi Inoue, Itami, Japan

[73] Assignee: Mitsubishi Denki Kabushiki Kaisha, Tokyo, Japan

[21] Appl. No.: 917,377

[22] Filed: Jul. 23, 1992

[30] Foreign Application Priority Data

Jul. 24, 1991 [JP] Japan .................................. 3-184308

[51] Int. Cl.$^5$ .......................................... G06K 19/06
[52] U.S. Cl. ..................................... 235/492; 235/493; 235/380
[58] Field of Search ......................... 235/492, 493, 380

[56] References Cited

U.S. PATENT DOCUMENTS

| | | | |
|---|---|---|---|
| 4,791,285 | 12/1988 | Ohki | 235/493 X |
| 4,837,556 | 6/1989 | Matsushita et al. | 340/310 R |
| 4,960,983 | 10/1990 | Inoue | 235/449 |
| 5,113,184 | 5/1992 | Katayama | 235/382.5 X |
| 5,157,247 | 10/1992 | Takahira | 235/492 |
| 5,182,442 | 1/1993 | Takahira | 235/492 |
| 5,198,647 | 3/1993 | Mizuta | 235/493 X |
| 5,202,838 | 4/1993 | Inoue | 364/480 |
| 5,212,373 | 5/1993 | Fujioka et al. | 235/492 |
| 5,220,158 | 6/1993 | Takahira et al. | 235/492 |

FOREIGN PATENT DOCUMENTS 4004740 8/1990 Fed. Rep. of Germany.
4100693 7/1991 Fed. Rep. of Germany.

Primary Examiner—Dnoald Hajec
Assistant Examiner—Adrian Young
Attorney, Agent, or Firm—Leydig Voit & Mayer

[57] ABSTRACT

A non-contact type IC card includes a power-supply receiving device for receiving power through electromagnetic coupling with a terminal unit; a signal transmitting/receiving device for exchanging signals with a terminal unit; a signal processing device, connected to the power-supply receiving device and the signal transmitting/receiving device, for processing signals; and a resetting device, connected to the signal processing device, for resetting the signal processing device when there is no signal exchange. A method of initializing a non-contact type IC card which receives power through electromagnetic coupling with a terminal unit and which exchanges signals with the terminal unit includes measuring elapsed time from a signal exchange between an IC card and the terminal unit and resetting the IC card if no signal exchange occurs after the elapsed time exceeds a predetermined value.

9 Claims, 5 Drawing Sheets

NON-CONTACT IC CARD AND METHOD OF INITIALIZING SAME

BACKGROUND OF THE INVENTION

1. Field of the Invention

The present invention relates to a non-contact type portable carrier and a method of initializing the same. More particularly, the present invention relates to a non-contact type portable carrier to which a power-supply voltage is supplied from a terminal unit by electromagnetic coupling and to a method of initializing the carrier.

2. Description of the Related Art

FIG. 5 shows the construction of a conventional non-contact type portable carrier (hereinafter referred to as an IC card) employing electromagnetic coupling. An IC card 3 has a coil 4 which is electromagnetically connected to a coil 2 of a terminal unit 1. A rectifying circuit 5 for full-wave rectifying AC power is connected to the coil 4. Connected to the rectifying circuit 5 are a capacitor 6 for smoothing pulsating current waveforms, a waveform shaping circuit 7 for detecting and shaping clock signals from AC waves, and a level detection circuit 8 for extracting signals from full-wave rectified waves. A processing circuit 11 is connected to the rectifying circuit 5, the waveform shaping circuit 7 and the level detection circuit 8 via signal lines 15, 14 and 10, respectively. Reference numerals 9a, 9b and 9c denote respective resistors for supplying bias and signal voltages to the level detection circuit 8.

A transistor 12 and an adjustment resistor 13 are connected in series between both ends of the coil 4. A signal output terminal of the processing circuit 11 is connected to the gate of the transistor 12. In addition, the IC card 3 has a reset coil 17 which is electromagnetically connected to a reset coil 16 of the terminal unit 1. A reset terminal $\overline{RE}$ of the processing circuit 11 is connected to the reset coil 17 via a waveform shaping circuit 18. Reference numeral 19 denotes a capacitor for smoothing a reset signal induced in the reset coil 17.

The operation of the conventional IC card 3 will now be explained with reference to the flowchart of FIG. 6. First, the IC card 3 is inserted into the terminal unit 1, and the coil 4 of the IC card 3 approaches the coil 2 of the terminal unit 1. In this condition, when supplying of power is started from the terminal unit 1 in step S1, power is induced in the coil 4 of the IC card 3 by electromagnetic induction, thus activating the IC card 3. Next, the terminal unit 1 sends out a reset signal to the IC card 3 from the reset coil 16 in order to initialize the processing circuit 11. The reset signal is input to the processing circuit 11 via the reset coil 17 and the waveform shaping circuit 18 of the IC card 3. In the IC card 3, if it is confirmed in step S2 that the reset signal is being received, the process proceeds to step S3 where the processing circuit 11 is initialized.

Thereafter, when the signal is sent from the terminal unit 1 via the coil 2, the process proceeds from step S2 to step S4 where the IC card 3 receives a signal. The signal detected by the level detection circuit 8 is input to the processing circuit 11. In step S5, the received signal is processed and evaluated by the processing circuit 11. In step S6, the processing circuit 11 sends out the result of the processed signal to the terminal unit 1 by controlling, i.e., turning on and off the transistor 12. When it is determined in the following step S7 that a series of transmissions and receptions of signals between the processing circuit 11 and the terminal unit 1 has been terminated, the IC card 3 receives a reset signal from the terminal unit 1 in step S8. Thereupon, the processing circuit 11 is initialized in step S9, and all processes are terminated.

However, in the conventional IC card 3, there is a problem in that the IC card 3 cannot be made smaller because the reset coil 17 must be provided separately from the coil 4 for receiving power and signals. In addition, since a dedicated reset signal must be sent from the terminal unit 1 in order to initialize the processing circuit 11 of the IC card 3, protocols for signal transmission by the terminal unit 1 become complicated.

SUMMARY OF THE INVENTION

The present invention has been accomplished to solve the above-mentioned problems of the prior art.

An object of the present invention is to provide a non-contact type portable carrier which is capable of being initialized without using a reset coil or a dedicated reset signal.

Another object of the present invention is to provide a method of initializing a non-contact type portable carrier, even if a dedicated reset signal is not sent from a terminal unit.

A non-contact type portable carrier in accordance with the present invention comprises power receiving means for receiving a power-supply voltage from, but without contact with, a terminal unit; signal transmitting/receiving means for transmitting signals to and receiving signals from a terminal unit without contact; signal processing means, connected to the power-supply receiving means and the signal transmitting/receiving means, for processing signals; and resetting means, connected to the signal processing means, for resetting the signal processing means when there is no active data signal.

The method of initializing the non-contact type portable carrier in accordance with the present invention pertains to a method in which a power-supply voltage is received from the terminal unit without contact and signals are transmitted/received. The method comprises the steps of measuring the elapsed time from when a data signal is either received by a portable carrier from a terminal unit or is transmitted by a portable carrier to a terminal unit; and resetting the portable carrier if another data signal is neither received by a portable carrier from a terminal unit nor transmitted to a terminal unit from a portable carrier, when the measured elapsed time exceeds a predetermined value.

DESCRIPTION OF THE PREFERRED EMBODIMENT

An embodiment of the present invention will be explained below with reference to the accompanying drawings.

Figure 1:
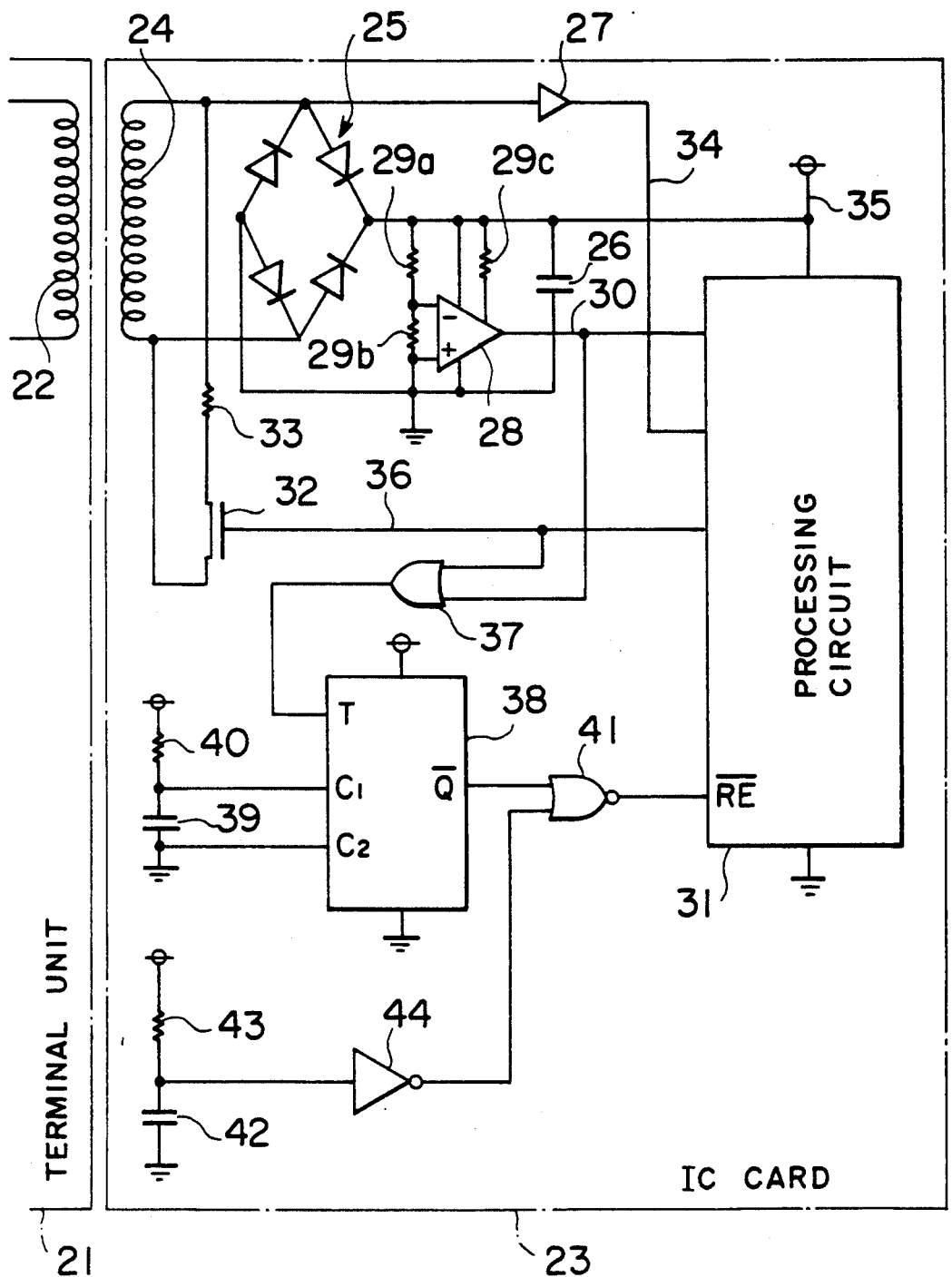
FIG. 1 is a circuit diagram which illustrates the construction of a non-contact type portable carrier according to an embodiment of the present invention.

FIG. 1 is a circuit diagram which illustrates the construction of an IC card 23 according to an embodiment of the present invention. An IC card 23 has a coil 24 which is electromagnetically connected to a coil 22 of a terminal unit 21. A rectifying circuit 25 for full-wave rectifying AC power is connected to the coil 24. Connected to the rectifying circuit 25 are a capacitor 26 for smoothing pulsating current waveforms, a waveform shaping circuit 27 for detecting and shaping clock signals from AC waves, and a level detection circuit 28 for extracting signals from full-wave rectified waves. A processing circuit 31 is connected to the rectifying circuit 25, the waveform shaping circuit 27 and the level detection circuit 28 via signal lines 35, 34 and 30, respectively. Reference numerals 29a, 29b and 29c denote respective resistors for supplying a bias to the level detection circuit 28. A transistor 32 and an adjustment resistor 33 are connected in series across the coil 24. A signal output terminal of the processing circuit 31 is connected to the gate of the transistor 32.

An OR circuit 37 is connected to signal lines 30 and 36. A terminal T of a re-trigger circuit 38 is connected to the output end of the OR circuit 37. A terminal $C_1$ of the re-trigger circuit 38 is connected to one end of a capacitor 39 and also to the power-supply line via a resistor 40. A terminal $C_2$ thereof is connected to the other end of the capacitor 39 and is also grounded. A NOR circuit 41 is connected to a terminal $\overline{Q}$ of the re-trigger circuit 38. A resistor 43 and a capacitor 42 are connected in series between the power-supply line and the ground. The NOR circuit 41 is connected to a connection point of the resistor 43 and the capacitor 42 via a waveform shaping circuit 44. The output end of the NOR circuit 41 is connected to a reset terminal $\overline{RE}$ of the processing circuit 31.

The coil 24, the rectifying circuit 25 and the capacitor 26 are included in a power-supply receiving means; the coil 24, the rectifying circuit 25, the level detection circuit 28, and resistors 29a, 29b and 29c are included in the signal transmitting/receiving means; the processing circuit 31 is a signal processing means; and the OR circuit 37, the re-trigger circuit 38, capacitors 39 and 42, resistors 40 and 43, the NOR circuit 41 and the waveform shaping circuit 44 are included in a resetting means.

The capacitor 42, the resistor 43 and the waveform shaping circuit 44 from among the resetting means are an initial self-reset circuit. When the power supply of the IC card 23 is powered, a H-level signal is input to the NOR circuit 41 for a predetermined time period determined by the capacitance of the capacitor 42 and the value of the resistor 43. An L-level reset signal is input to the reset terminal $\overline{RE}$ of the processing circuit 31 from the NOR circuit 41. Thereupon, an initial resetting of the processing circuit 31 is performed.

Figure 2:
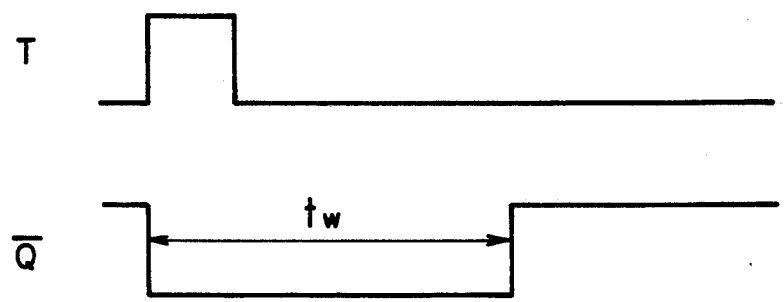
FIG. 2 is a timing chart which illustrates the operation of a re-trigger circuit used in the embodiment shown in FIG. 1.
Figure 3:
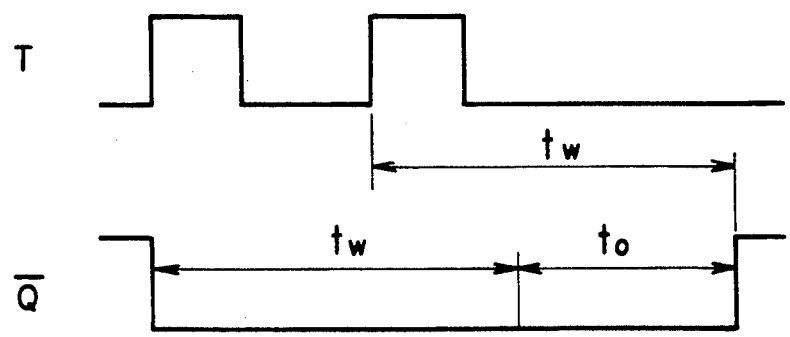
FIG. 3 is a timing chart which illustrates the operation of a re-trigger circuit used in the embodiment shown in FIG. 1.

The operation of the re-trigger circuit 38 will now be explained. When a received signal is detected by the level detection circuit 28 or when a transmission signal is transmitted from the processing circuit 38 via the transistor 32, a H-level signal is input to the terminal T of the re-trigger circuit 38 via the OR circuit 37. Thereupon, as shown in FIG. 2, the re-trigger circuit 38 outputs an L-level signal from the terminal $\overline{Q}$ for a predetermined time period $t_w$ determined by the capacitance of the capacitor 39 connected to terminals $C_1$ and $C_2$ and by the value of the resistor 40. As shown in FIG. 3, when a H-level trigger signal is input to the terminal T while the output of the terminal $\overline{Q}$ is maintained at L level, an L-level signal is output from the terminal $\overline{Q}$ for a predetermined time $t_w$ from the time the trigger signal is input. That is, the duration of the L-level signal output from the terminal $\overline{Q}$ is extended by time to as a result of a second trigger signal being input.

Accordingly, if another signal is received or transmitted while an L-level signal is being output from the terminal $\overline{Q}$ of the re-trigger circuit 38, the L-level output of the $\overline{Q}$ is maintained. In this condition, as long as a H-level signal is not output to the NOR circuit 41 from the initial self-reset circuit, the output of the NOR circuit 41 is maintained at H level, thus causing no resetting of the processing circuit 31. In contrast, when detection of both the received signals and the transmitted signals has ceased for a time exceeding a predetermined time $t_w$, the output $\overline{Q}$ of the re-trigger circuit 38 is turned to level H. As a result, an L-level reset signal is output to the reset terminal $\overline{RE}$ of the processing circuit 31 through the NOR circuit 41, causing the processing circuit 31 to be reset.

The predetermined time $t_w$ can be set to a desired value by selecting the capacitance of the capacitor 39 and the value of the resistor 40, provided that the predetermined time $t_w$ is set to a value larger than the signal pulse duration in the transmission/reception of signals in a normal sequence.

Figure 4:
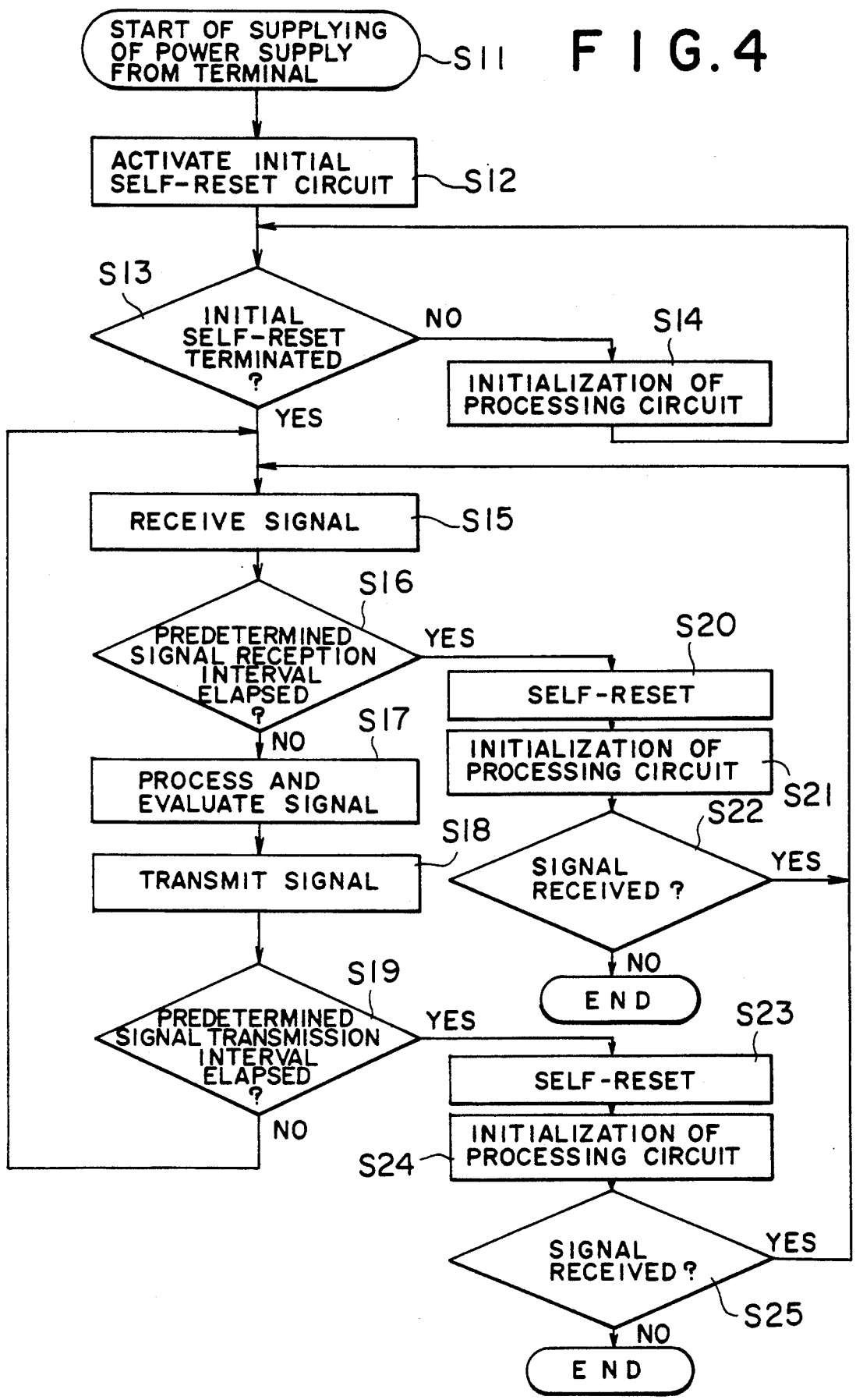
FIG. 4 is a flowchart which illustrates the operation of the embodiment shown in FIG. 1.
Figure 5:
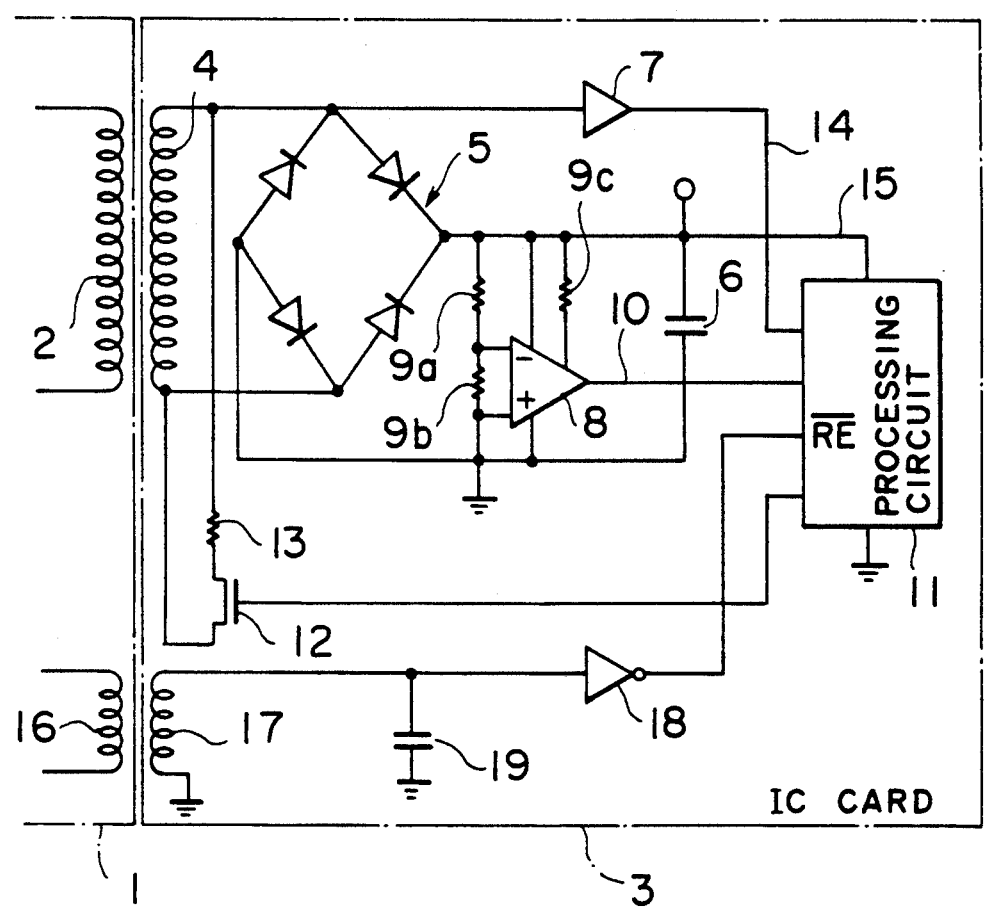
FIG. 5 is a circuit diagram which illustrates the construction of a conventional non-contact type portable carrier.
Figure 6:
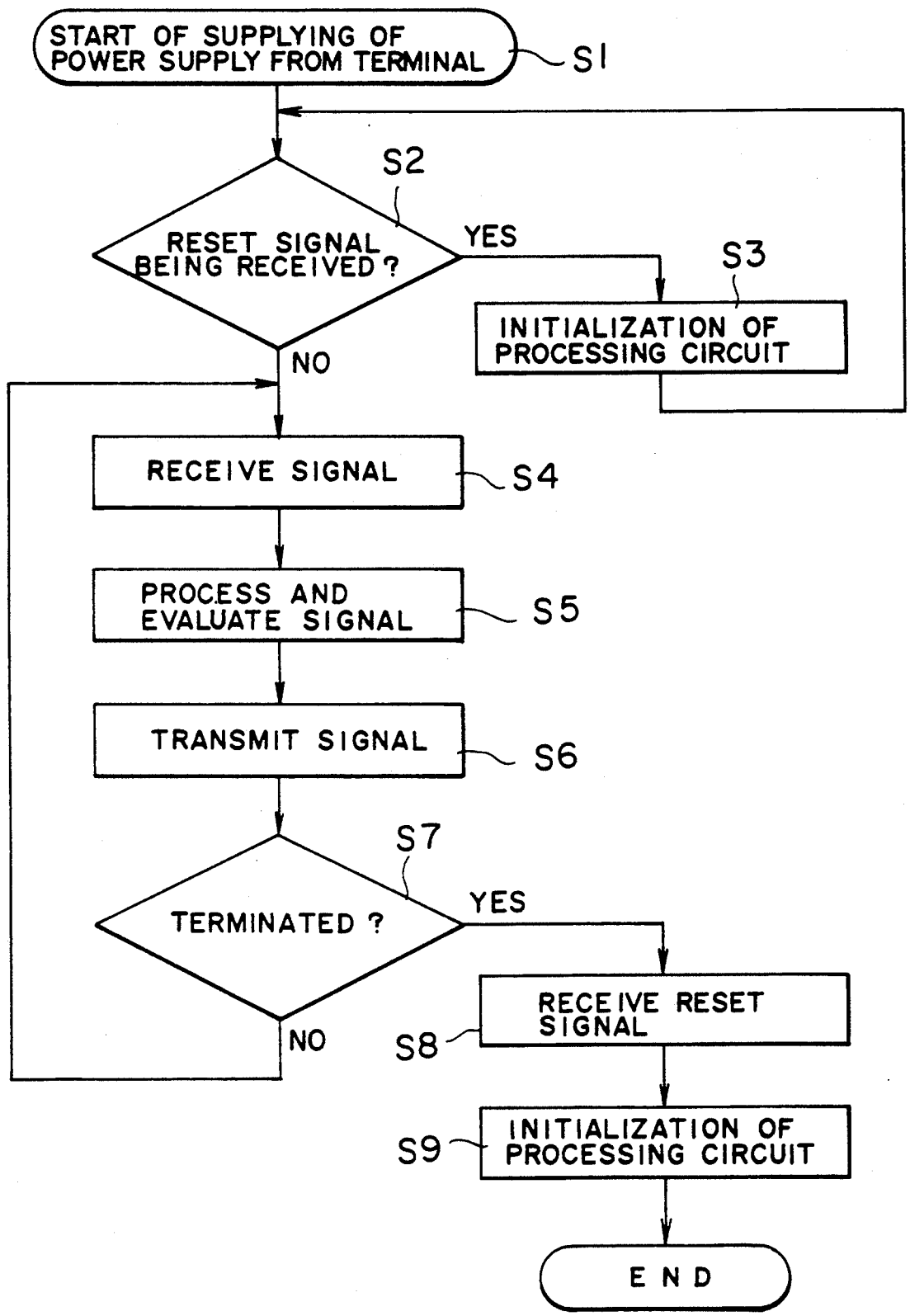
FIG. 6 is a flowchart which illustrates the operation of the non-contact type portable carrier shown in FIG. 5.

Next, the operation of the IC card 23 of this embodiment will be explained with reference to the flowchart of FIG. 4. First, the IC card 23 is inserted into the terminal unit 21, and the coil 24 of the IC card 23 approaches the coil 22 of the terminal unit 21. In this condition, when the power supply is started from the terminal unit 21 in step S11, power is induced in the coil 24 of the IC card 23 by electromagnetic induction, activating the IC card 23. When the power supply of the IC card 23 is powered, as described above, the initial self-reset circuit is activated in step S12. An L-level reset signal is input to the reset terminal $\overline{RE}$ of the processing circuit 31 for a predetermined time period determined by the capacitance of the capacitor 42 and the value of the resistor 43. In this way, an initial reset is caused in the processing circuit 31 in step S14 until it is determined in step S13 that a predetermined time for the initial self-reset has elapsed.

When a signal is sent from a terminal unit 21 through the coil 22 after a lapse of a predetermined time, the process proceeds from step S13 to step S15 where the IC card 23 receives a signal. The signal detected by the level detection circuit 28 is input to the processing circuit 31 and also through the OR circuit 37 to the terminal T of the re-trigger circuit 38. Thereupon, the output of the $\overline{Q}$ is turned to L level. In the following step S16, it is determined whether the signal is received in a normal signal pulse duration. When it is determined that the signal is received in a normal signal pulse duration, that is, when another received signal pulse is detected by the time a predetermined time constant $t_w$ determined by the capacitance of the capacitor 39 connected to the terminals $C_1$ and $C_2$ of the re-trigger circuit 38 and by the value of the resistor 40, has elapsed, the output of the $\overline{Q}$ is maintained at L level by a trigger signal being input to the terminal T of the re-trigger circuit 38. As a consequence, the output of the NOR circuit 41 is turned to H level; thus, the processing circuit 31 is not reset. In step S17, the received signal is processed and evaluated by the processing circuit 31.

In step S18, the processing circuit 31 transmits the result of the processed signal to the terminal unit 21 by controlling the transistor 32. At this time, in step S19, it is determined whether the signals have been transmitted in a normal signal pulse duration. When it is determined that the signals have been transmitted in a normal signal pulse duration, that is, when another transmission signal pulse is transmitted by the time the predetermined time $t_w$ has elapsed, the output of the $\overline{Q}$ is maintained at L level by a trigger signal being inputted to the terminal T of the re-trigger circuit 38. As a consequence, the output of the NOR circuit 41 is turned to H level, and the processing circuit 31 is not reset. The process returns to step S15 where another signal is received.

In contrast, when it is determined in step S16 that the signals have not been received in a normal signal pulse duration, that is, when another received signal pulse is not detected by the time the predetermined time $t_w$ has elapsed, the output of the $\overline{Q}$ of the re-trigger circuit 38 is turned from L level to H level when the predetermined time $t_w$ has elapsed. As a consequence, the output of the NOR circuit 41 is turned to L level, causing a self-resetting in the processing circuit 31 in step S20, and the processing circuit 31 is initialized in step S21. Thereafter, if it is determined in step S22 that there is another signal received from the terminal unit 21, the process returns to step S15 where a signal is received. When there is no received signal, all processes of transmitting/receiving signals with the terminal unit 21 are terminated.

In like manner, when it is determined in step S19 that signals have not been transmitted in a normal signal pulse duration, that is, another transmission signal pulse is not transmitted even if the predetermined time $t_w$ has elapsed, the output of the $\overline{Q}$ of the re-trigger circuit 38 is turned from L level to H level when the predetermined time $t_w$ has elapsed. As a consequence, the output of the NOR circuit 41 is turned to L level, causing a self-resetting in the processing circuit 31 in step S23. In step S24, the processing circuit 31 is initialized. Thereafter, when it is determined that there is a signal received from the terminal unit 21 in step S25, the process returns to step S15 where a signal is received. When there is no received signal, all processes of transmitting/receiving signals with the terminal unit 21 are terminated.

What is claimed is:

1. A non-contact IC card comprising:
   power-supply receiving means for receiving power through electromagnetic coupling with a terminal unit;
   signal transmitting/receiving means for transmitting signals to and receiving signals from the terminal unit;
   signal processing means, connected to the power-supply receiving means and the signal transmitting/receiving means, for processing signals; and
   resetting means, connected to the signal processing means, for resetting the signal processing means when no signal has been transmitted by the signal transmitting/receiving means during a predetermined time period after the signal transmitting/receiving means has transmitted a signal.

2. The non-contact IC card according to claim 1 wherein the resetting means resets the signal processing means when no signal has been received during a predetermined time period after the signal transmitting/receiving means has received a signal.

3. The non-contact IC card according to claim 1 wherein the power-supply receiving means, the signal transmitting/receiving means, the signal processing means, and the resetting means are integrated in a single integrated circuit.

4. A method of initializing a non-contact IC card that receives power through electromagnetic coupling with a terminal unit and that exchanges signals with the terminal unit by transmitting signals to and receiving signals from the terminal unit comprising:
   measuring elapsed time after exchange of a signal between the IC card and a terminal unit; and
   resetting the IC card if no signal is transmitted from the IC card to the terminal unit when the elapsed time exceeds a predetermined value.

5. A non-contact IC card comprising:
   power-supply receiving means for receiving power through electromagnetic coupling with a terminal unit;
   signal transmitting/receiving means for transmitting signals to and receiving signals from the terminal unit;
   signal processing means, connected to the power-supply receiving means and the signal transmitting/receiving means, for processing signals; and
   resetting means, connected to the signal processing means, for resetting the signal processing means when the power-supply receiving means begins receiving power from the terminal unit.

6. A non-contact IC card comprising:
   power-supply receiving means for receiving power through electromagnetic coupling with a terminal unit;
   signal transmitting/receiving means for transmitting signals to and receiving signals from the terminal unit;
   signal processing means, connected to the power-supply receiving means and the signal transmitting/receiving means, for processing signals; and
   resetting means, connected to the signal processing means, for resetting the signal processing means and comprising a re-trigger circuit receiving a trigger signal from the signal transmitting/receiving means when a signal is transmitted by and when a signal is received by the IC card, the re-trigger circuit for outputting a reset signal to the signal processing means when no trigger signal is received during a predetermined time period after a trigger signal is received from at least one of the signal transmitting/receiving means and the signal processing means.

7. The method of claim 4 including resetting the IC card if no signal is received by the IC card from the terminal unit when the elapsed time exceeds the predetermined value.

8. A non-contact IC card comprising:
   power-supply receiving means for receiving power through electromagnetic coupling with a terminal unit;

signal transmitting/receiving means for transmitting signals to and receiving signals from the terminal unit;

signal processing means, connected to the power-supply receiving means and the signal transmitting-/receiving means, for processing signals; and resetting means, connected to the signal processing means, for measuring time following the most recent of transmission of a signal to and reception of a signal from the terminal unit and resetting the signal processing means after a lapse of a predetermined time period without transmission of a signal to the terminal unit.

9. The non-contact IC card according to claim 8 wherein the resetting means resets the signal processing means when no signal has been received by the IC card from the terminal unit when the elapsed time exceeds the predetermined time period.

* * * * *